Dec. 18, 1956     E. C. BERNHARDT     2,774,105
EXTRACTION-EXTRUSION APPARATUS
Filed April 27, 1954
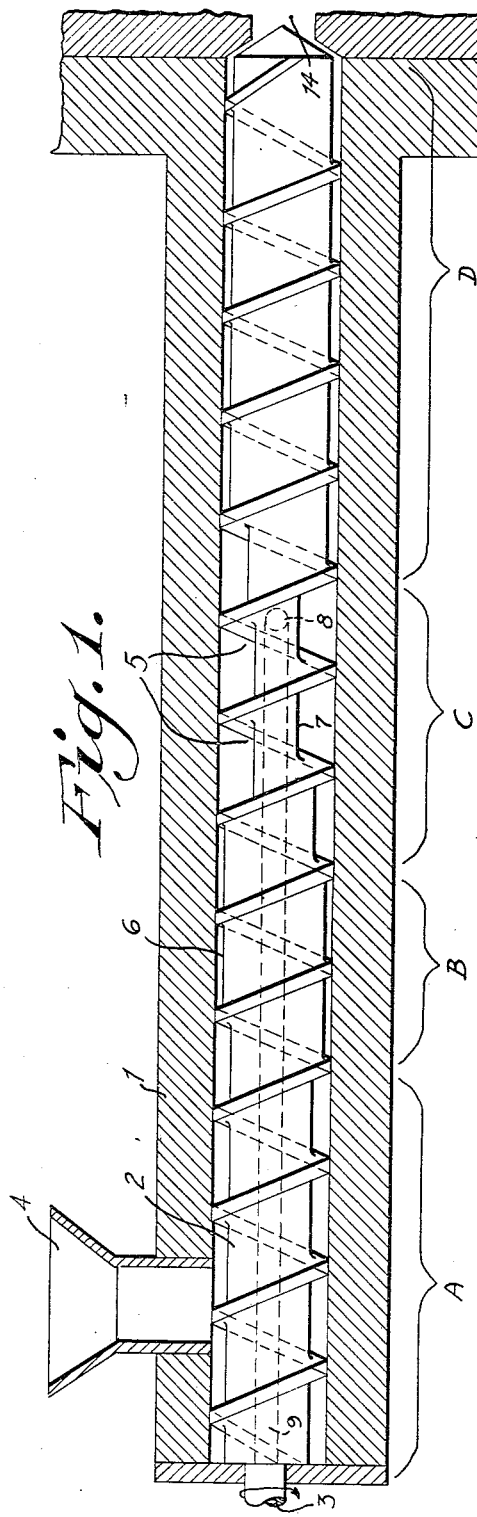
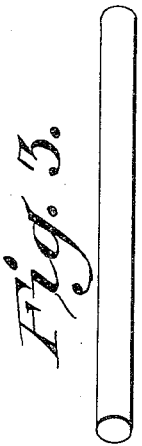
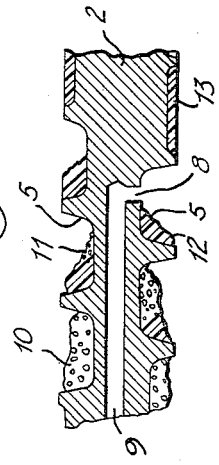
INVENTOR
ERNEST C. BERNHARDT
BY
ATTORNEY United States Patent Office 2,774,105
Patented Dec. 18, 1956

2,774,105
EXTRACTION-EXTRUSION APPARATUS

Ernest C. Bernhardt, Montclair, N. J., assignor to E. I. du Pont de Nemours and Company, Wilmington, Del., a corporation of Delaware Application April 27, 1954, Serial No. 425,985

3 Claims. (Cl. 18—12)

This invention relates to a novel extraction-extrusion process and device, and in particular this invention relates to a method for removing solvent or other volatile impurity from a synthetic plastic containing the same, and thus producing an extruded melt of that plastic free of volatile impurity. More especially the method of this invention is well adapted for removal of small quantities of volatile liquid impurities, in the absence of liquid contaminants other than these absorbed liquid impurities.

Many of the present day synthetic plastic materials are prepared in the form of solids having gaseous or liquid components absorbed (i. e. dissolved etc.) or occluded therein. Some plastic materials are synthesized in the form of a slurry in which case the liquid medium must be removed in some manner if the plastic is to be prepared into a solid form such as granules or a sheet material or the like. Some of the known synthetic plastics may be separated from at least a part of such liquid by means of filtration, decanting, drying, and other means known to those skilled in the art. However, there are materials such as the acrylic (including alkacrylic) polymers, synthetic linear polycarbonamides of the nylon type, cellulose acetate, polystyrene, etc., which are prepared and in a form such that they contain liquid components which are not readily removable by such means. For example, some of these polymeric products are hygroscopic, and require special treatment for removal of absorbed water before they can be extruded. If this pre-drying step is not carried out, the moisture in the resin causes bubbles in the melt, as it leaves the extruder die. Other polymers, as usually prepared, contain traces of monomers or miscellaneous volatile impurities, which affect the quality of extrudates and which are sometimes difficult to remove. Accordingly, it would be highly desirable if such compositions could be processed in a single operation to produce a melted extrudate which might be in the form of a sheet or other desired shape.

It is an object of this invention to provide an extraction-extrusion device into which may be fed a mixture of polymeric material and a volatile component, and out of which there is obtained a melted extrudate free of the volatile material which was present in the feed material.

The accompanying illustrative drawing shows certain features of the extrusion-extraction device of this invention. In this apparatus, an extrusion screw (having special characteristics described below) cooperates with an extrusion barrel and an extruder feeding means in the manner shown in Figure 1.

Figure 1 is a cross section view of a housing containing an extrusion screw hereinbelow described in detail. Figure 2 is a cross section view of the portion of the screw showing the communication between the plastic material, i. e. the source of vapor, and the hollow core. Figure 3 and Figure 4 show, respectively, the bubble-free extrudate formed by the use of the extrusion screw of Figure 1 and the extrudate containing bubbles obtained by the use of an ordinary extrusion screw not equipped with the vapor-withdrawing core.

In Figure 1 the entire device is divided into four sections indicated by the letters A, B, C, and D. The section designated as A is known as the feed section. Section B is known as the metering or throttle section. Section C is known as the extraction section. Section D is known as the extrusion section. The apparatus consists essentially of a barrel 1, into which there is fitted a screw device 2, which is rotatably driven in the indicated direction by a suitable power source connected at 3. The resin containing the volatile impurity is continuously fed into section A through feed hopper 4. The resin is advanced by the rotation of screw 2 through sections A, B, C, and D in that order. By the time the resin has reached section B, it is a viscous melted material containing a small amount of the volatile material introduced into hopper 4 with the feed as absorbed impurity. In section B the root diameter of the screw has been increased to such an extent that the channel through which the plastic travels is considerably reduced in size, whereby the flow of the plastic melt is throttled. It is preferable that the root diameter of the screw be increased gradually from some point in the center of section A to the entrance of section B although such an increase in the root diameter may take place if desired over something less than a pitch length of the screw. At the entrance to section C the root diameter of the screw is reduced, which makes the drag flow capacity (defined at page 974, Industrial and Engineering Chemistry, May 1953) in section C greater than in section B. Generally, the drag flow capacity in section C is at least twice as great as that of section B. Accordingly, the conveying capacity of section C is greater than the capacity of section B. In section C there is a space 5 in the forward part of the channel which the plastic material does not fully occupy. The space 5 is normally evacuated so that the melt leaving section B will be subjected to a flash evaporation upon entering section C and, by reason of this evaporation, much of the remaining volatile liquid in the plastic material will be removed. If it is convenient or desirable, the barrel 1 which surrounds the screw may be heated by steam coils, electric coils, or the like. Section D is merely an ordinary extrusion device wherein a preferably smooth barrel surrounds the screw 2 and plastic material is forced through the section and out a convenient die such as indicated at 14. The drag flow capacity in section D is greater than that in the metering zone, or at least equal thereto.

Section B is usually no less than about two pitch lengths of screw 2. In this section the root diameter of screw 2 is at its maximum value having been increased to the diameter shown at 6. Such a restriction as indicated at section B may serve more than one purpose since this restriction throttles the flow, and may act as a metering device gauging the flow of plastic material through the entire extrusion device as well as increase the pressure and temperature of the plastic material just prior to its introduction into section C shown in Figure 1. In section C, the material is subjected to a vacuum to remove virtually all of the volatiles, or to lower the amount thereof to the desired concentration in the final product. By increasing the pressure and temperature of the plastic material in section B and by sharply reducing the root diameter of screw 2 (shown in somewhat exaggerated fashion at 7) in extraction (vacuum) zone of section C the release of the volatile impurity is greatly intensified by the sudden reduction in pressure. In effect, there is obtained a flash evaporation effect which speeds the removal of the remaining volatile liquid in section C. If it is desirable, barrel 1 may be supplied with a means for heating such that the plastic material carried through sections B and C may be heated to accomplish better evaporation.

An essential and critical feature of the present invention is the means provided for removal of vapor from section C. It is surprising that by providing an opening 8 communicating with the bore 9, in the extrusion screw, it becomes possible to apply a vacuum to the space 5 without danger of plugging the exhaust lines. The opening 8 is located in the forward part of section C, which is free of resin in the vicinity of the said opening. The reason for this is related to the tendency of the device to acculate resin at the rearward part of space 5, leaving free space in the forward portion.

The functioning of the means for removing vapor from the extraction zone C is shown in more detail in Figure 2, which is a cross section view of a fragment of the screw 2, in the forward portion of section C, showing how the molten plastic is distributed therein during operation of the device. When the plastic first enters section C it foams and spreads across the channel between threads as shown at 10. As the foam subsides unfoamed resin collects in front of the screw thread, with relatively little foamed resin spreading along the channel, in advance thereof, as shown at 11. Finally, before leaving section C the resin is located almost entirely immediately in front of the thread, shown at 12, as a result of which the port 8 is kept open. As the resin advances into section D it is usually compressed so as to occupy a major part of the channel as shown at 13.

Section D, as shown in Figure 1, is a pressure zone (i. e. extrusion zone) which has a drag flow capacity at least as great as that of the metering zone, and generally less than that of the extraction zone. The pressure zone D communicates directly with the extrusion die 14.

Figure 3 shows a clear plastic rod as extruded by use of the above-described screw. Figure 4 shows a rod containing numerous bubbles, produced by extrusion without the vapor-exhausting means just described.

In commercial practice methyl methacrylate polymer which has been freed of ingredients which cause bubbles on extrusion (this can be done by prolonged working on large warm milling rolls) is more expensive than methyl methacrylate polymer which has not been thus treated. The present invention permits the extrusion of the latter grade of commercial product without bubble-formation, and without any significant increase in extrusion cost. In the commercial extrusion of nylon it is essential to use dried product which has been shipped in closed cans to assure continued dryness, for otherwise the nylon picks up water and behaves in the same manner as unmilled methyl methacrylate polymer. The present invention facilitates the shipment and storage of nylon for extrusion purposes by eliminating the need for keeping the polymer intensively dried.

The following example serves to illustrate this invention.

*Example 1.*—A granular methyl methacrylate polymer composition containing traces of moisture, monomer and mercaptans was found to give, on extrusion with a normal screw, a product which contained bubbles. Even when this sample of granular polymer was dried for prolonged periods of time at 70° C. it could not be extruded at rates above 20 lbs. per hour, or at screw speeds above 24 R. P. M. without creating bubbles. The same material was treated in the extrusion device (barrel inside diameter, 2 in.) hereinabove described at a screw speed of 96 R. P. M. at the rate of 50 lbs. per hour without the formation of bubbles in the extrudate. The vacuum applied at the hollow screw core was 28 in. of mercury. The extracted fluid (vapor) was collected as a condensate, in the form of two layers, namely, a water-layer and a monomer-mercaptan layer.

The materials which may be processed by the extrusion device of this invention may be any of a variety of synthetic plastic materials which are produced with occlusions of volatile or gaseous material which is desirably removed before the plastic material is extruded or otherwise formed into its final shape.

The present invention is concerned primarily with purification of resins containing traces of volatile impurities, as distinguished from aqueous slurries or other mixtures having a resin suspended in a liquid medium.

Although the device of this invention has been described in terms of a single screw and barrel, it is not intended that such limitation be imposed on this apparatus or process. The features of this invention are equally applicable to multiple screw extruders. One example of such is a twin screw extruder, wherein two screws which are identical, except that one has a right-hand thread while the other has a left-hand thread, are employed in a side-by-side relationship and are rotated toward each other in the nature of meshed gears or rolling mills. These multiple screws may be intermeshing or non-meshing with adjacent screws.

Moreover, the vapor-withdrawal means providing communication between the hollow core 9 and the space 5 may be more than one port instead of only one, as shown in the drawing. The vapor-exhausting means may be a vacuum pump or other similar "vacuum"-producing device, i. e., device for withdrawing gas or reducing the pressure thereof.

The invention is not limited to the employment of screws and cooperating barrels having helical threads which have a constant pitch, although such constant pitch serves the intended purpose satisfactorily. In many embodiments of this invention, however, it may be advantageous to employ a screw with a variable pitch in one or more of the described sections of the extrusion device. Various combinations of variable and constant pitch threads will be apparent to those skilled in the art; for example, a screw with a variable pitch thread, or a screw with a variable pitch in the feed section and compounding section and a constant pitch in the vacuum extraction section and extrusion section. These, and other combinations, are intended to be included in the hereindescribed invention.

The extraction-extrusion device of this invention is useful in the processing of many of a variety of plastic materials where it is desired to blend plasticizers, pigments, fillers, and other materials with a polymer in a dispersion form and to produce an extrudate readily for molding into a desired shape. It will be appreciated that the exit of this device may be fitted with any of a variety of molds, dies, calendering rolls and other known devices which are useful in transforming a molten plastic into sheets, rods, tubes, and articles of any shape whatsoever.

I claim:

1. An extrusion-extraction apparatus for removing volatile component from a mixture of a plastic material containing said volatile component, comprising a cylindrical barrel, a helical screw conveying device rotatably mounted in said barrel and a means for driving said screw conveying device, said screw having a zone of greater drag-flow capacity following a throttling zone of lesser drag flow capacity, said screw having a hollow core communicating with the said zone of greater drag-flow capacity, and with a means for applying a vacuum thereto, said communication being positioned in the forward half of the zone of greater drag-flow capacity, and in the forward half of a channel between threads in the said zone.

2. An apparatus according to claim 1 wherein there is a channel between the said screw and the said barrel which comprises four zones, namely, (1) a feed zone, communicating with a means for introducing a mixture of plastic containing volatile impurity, (2) a zone which throttles the flow from the feed zone and governs the output rate of the extruder, (3) an extraction zone which has a drag-flow capacity greater than that of the metering zone, and (4) an extrusion zone having a drag flow capacity at least as great as that of the said metering zone.

3. An apparatus according to claim 2 wherein the said screw is of constant pitch.

References Cited in the file of this patent

UNITED STATES PATENTS

| | | |
|---|---|---|
| 1,156,096 | Price | Oct. 12, 1915 |
| 2,039,162 | Gerstenberg | Apr. 28, 1936 |
| 2,528,200 | Weinberg | Oct. 31, 1950 |
| 2,615,199 | Fuller | Oct. 28, 1952 |
| 2,680,880 | Corbett | June 15, 1954 |